United States Patent
Suess et al.

(10) Patent No.: US 12,356,091 B2
(45) Date of Patent: Jul. 8, 2025

(54) METHODS FOR TRANSMITTING ASYNCHRONOUS EVENT DATA VIA SYNCHRONOUS COMMUNICATIONS INTERFACES USING ANTICIPATED EVENT RATES, AND ASSOCIATED IMAGING SYSTEMS

(71) Applicant: OMNIVISION TECHNOLOGIES, INC., Santa Clara, CA (US)

(72) Inventors: Andreas Suess, San Jose, CA (US); Kevin Johnson, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 320 days.

(21) Appl. No.: 18/177,616

(22) Filed: Mar. 2, 2023

(65) Prior Publication Data
US 2024/0297851 A1    Sep. 5, 2024

(51) Int. Cl.
*H04N 25/47*    (2023.01)

(52) U.S. Cl.
CPC .................. *H04N 25/47* (2023.01)

(58) Field of Classification Search
CPC ....... H04N 25/40; H04N 25/47; H04N 25/707
See application file for complete search history.

(56) References Cited

U.S. PATENT DOCUMENTS

| | | | |
|---|---|---|---|
| 7,388,853 B2 | 6/2008 | Ptasinski et al. | |
| 8,892,163 B2 | 11/2014 | Tsau et al. | |
| 11,563,909 B1 | 1/2023 | Chen et al. | |
| 2023/0360254 A1* | 11/2023 | Liu | G06V 20/10 |

OTHER PUBLICATIONS

T. Finateu et al., "A 1280x720 Back-Illuminated Stacked Temporal Contrast Event-Based Vision Sensor with 4.86um Pixels, 1.0666GEPS Readout, Programmable Event-Rate Controller and Compressive Data-Formatting Pipeline," ISSCC 2020, Session 5, Imagers and ToF Sensors, 5.10, pp. 112-114.
B. Son et al., "A 640x480 Dynamic Vision Sensor with a 9um Pixel and 300Meps Address-Event Representation," ISSCC 2017, Session 4, Imagers, 4.1, pp. 66-68.

(Continued)

*Primary Examiner* — Daniel M Pasiewicz
(74) *Attorney, Agent, or Firm* — Perkins Coie LLP; Daniel L. Jackstadt

(57) ABSTRACT

Methods for transmitting asynchronous event data via synchronous communications interfaces (and associated imaging systems) are disclosed herein. In one embodiment, an imager comprises an array of event vision pixels, and a synchronous communications transmitter configured to transmit frames of data to a synchronous communications receiver. The pixels generate event data based on activity within an external scene. The imager communicates, at a first time and to the receiver, an anticipated amount of data that will be included in a frame transmitted to the receiver at a second time. The anticipated amount of data can be based on a prediction of an amount of event data that will be generated at a future point in time for transmission to the receiver in the frame. The imager can then transmit the frame to the receiver at the second time with an amount of data corresponding to the anticipated amount of data.

42 Claims, 7 Drawing Sheets

(56) References Cited

OTHER PUBLICATIONS

Sony, Event-Based Vision Sensor (EVS),"https://www.sony-semicon.com/en/products/is/industry/evs.html.," 5 pages.
"Specification for Camera Serial Interface 2 (CSI-2SM)," MIPI Alliance, May 31, 2019, 338 pages.
C. Li et al., "A 132 by 104 10μm-Pixel 250μW 1kefps Dynamic Vision Sensor with Pixel-Parallel Noise and Spatial Redundancy Suppression," 4 pages.

* cited by examiner

METHODS FOR TRANSMITTING ASYNCHRONOUS EVENT DATA VIA SYNCHRONOUS COMMUNICATIONS INTERFACES USING ANTICIPATED EVENT RATES, AND ASSOCIATED IMAGING SYSTEMS

TECHNICAL FIELD

This disclosure relates generally to image sensors. For example, several embodiments of the present technology relate to methods for transmitting, via synchronous communications interfaces and using anticipated event rates, asynchronous event data generated by event vision sensors.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

Figure 1:
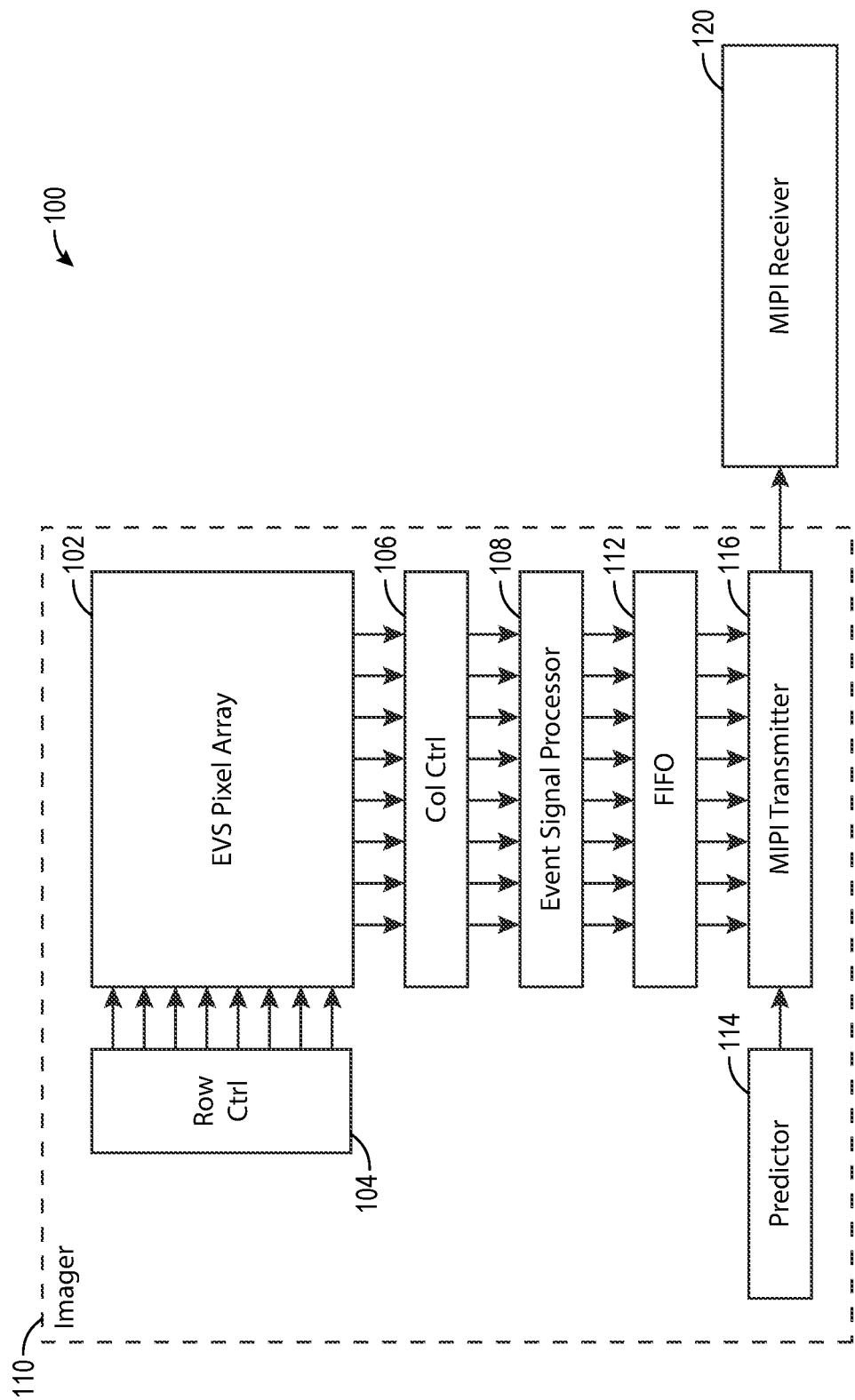
FIG. 1 is a partially schematic block diagram of an imaging system configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

The present disclosure relates to imaging systems including event vision sensors. For example, several embodiments of the present technology are directed to methods for transmitting, via synchronous communications interfaces and using anticipated event rates, asynchronous event data generated by event vision sensors. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below." "over," "under," "above." "upper." "top." "bottom," "left," "right," "center," "middle," and the like) may be used herein for case of description to describe one element's or ones feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under"

one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

Active pixel sensors (e.g., CMOS imaging systems) commonly employ an array of active pixels having an integration time that is globally defined. Thus, active pixels in an active pixel sensor typically have an identical integration time, and each pixel in the array is typically converted into a digital signal regardless of its content (e.g., regardless of whether there has been a change in an external scene that was captured by a pixel since the last time the pixel was read out). In other words, image data generated by active pixels in, for example, CMOS imagers are read out in frames of known size regardless of whether there are events in an external scene. Stated another way, the image data generated by active pixels is synchronously read out from the active pixels. Therefore, synchronous communications interfaces (e.g., mobile industry processor interfaces (MIPIs) governed by camera serial interface (CSI) communications protocols) are commonly used to read out or transmit synchronous image data from imagers incorporating active pixel sensors.

In comparison, event vision sensors (e.g., event driven sensors or dynamic vision sensors) read out a pixel and/or convert a corresponding pixel signal into a digital signal when the pixel captures a change (e.g., an event) in the external scene. In other words, pixels of an event vision sensor that do not detect a change in the external scene are not read out and/or pixel signals corresponding to such pixels are not converted into digital signals. Thus, each pixel of an event vision sensor can be independent from other pixels of the event vision sensor, and only pixels that detect a change in the external scene need be read out, and/or have their corresponding pixel signals converted into digital signals or recorded (thereby saving power). Stated another way, event data generated by event vision pixels can be asynchronously read out from the pixels and/or recorded whenever events are detected in an external scene.

Due to the asynchronous nature of event data generated by imagers employing event vision pixels, synchronous communications interfaces and protocols are typically not used to read out or transmit asynchronous event data from such imagers. Rather, such imagers typically employ custom asynchronous communications interfaces and protocols (e.g., address-event-representation (AER) interfaces/protocols) in combination with custom receivers (e.g., field-programmable gate arrays (FPGAs)) to read out or transmit the asynchronous event data. There are several reasons for why synchronous communications interfaces and protocols are not commonly employed with event vision sensors. Taking MIPIs as an example, a MIPI receiver (e.g., an application processor) typically (a) expects to receive a frame of event data of known size from a MIPI transmitter and (b) imposes timer restrictions for receiving the complete frame of event data from the MIPI transmitter. But the MIPI/CSI communications protocols that govern the interface typically do not require a fixed frame period for the MIPI transmitter to communicate a frame to the MIPI receiver. Thus, if (i) a MIPI transmitter is employed to transmit asynchronous event data out of an imager incorporating event vision sensors and (ii) the occurrence of events (e.g., the event rate) within an external scene detected by the imager is low, the imager may take an extensive period of time to generate enough event data to fill a frame having the known size that the MIPI receiver expects to receive. The excess latency in receipt of a full frame of event data at the MIPI receiver that is caused by the low event rate within the external scene can lead to timer overflow issues within the MIPI receiver that, in turn, can lead to the MIPI aborting the frame transmission, resulting in loss of any asynchronous event data that was included in the aborted frame.

To address these concerns, imagers incorporating event vision pixels and configured in accordance with various embodiments of the present technology each (a) employ a synchronous communications transmitter (e.g., a MIPI transmitter) that is configured to transmit frames of data out of the imager to a synchronous communications receiver (e.g., a MIPI receiver), and (b) are configured to communicate, to the receivers, indications of anticipated amounts of data that will be included in frames sent from the transmitter to the receiver at future points in time. The imagers communicate the indications of the anticipated amounts of data to the corresponding receivers in advance of transmitting the corresponding frames such that the receivers can adjust their local receiver circuits and controllers to accommodate receiving frames of the indicated sizes. Thereafter, the imagers transmit, to the receivers, frames that include amounts of data corresponding to the anticipated amounts of data previously communicated to the receivers.

In some embodiments, the anticipated amounts of data represent estimates or predications of amounts of data that will be included in the frames sent to the transmitter at the future points in time. In these embodiments, the imagers can include predictor blocks configured to generate the estimates. The estimates can be based at least in part on historical amounts of data included in one or more frames previously sent to the receivers. In these and other embodiments, the estimates can be based at least in part on one-dimensional (1D) or two-dimensional (2D) distributions of detected events across the event vision pixels of the imagers at a given time or over time (e.g., over multiple frames). In these and still other embodiments, the estimates can be based at least in part on indications of global activity of the event vision pixels at given times. For example, the imagers can include activity monitor circuits coupled to the event vision pixels and configured to generate activity monitor signals that are each representative of a total number of event vision pixels that have detected an event at a given time or within a given time period.

In other embodiments, the anticipated amounts of data represent actual amounts of event data that will be included in the frames sent to the transmitter at the future points in time. For example, the imagers can include memories (e.g., buffers) that are each configured to store multiple frames worth of event data. Continuing with this example, the imagers can ascertain exact amounts of event data that will be included in corresponding frames sent to the transmitter at future points in time, and the imagers can communicate these exact amounts to the receivers prior to transmitting the frames.

To communicate the anticipated amounts of data to the receiver, the imagers can insert indications of the anticipated amounts of data for future frames in header portions of frames currently being sent to the transmitter. For example, an imager can insert, at a first time and in a header portion of a first frame, an indication of an anticipated amount of data that will be included in a second frame that will be transmitted to the receiver in the future. The imager can then send the indication to the receiver in the first frame. Thereafter, the imager can transmit the second frame to the receiver with an amount of data corresponding to the anticipated amount of data communicated to the receiver in the first frame. As another example, an imager can write, to a local register, an indication of an anticipated amount of data that will be included in a future frame. In turn, the receiver can, prior to receiving the future frame, read the local register and adjust its local receiver circuit and controller accordingly.

In the event of a lower-than-anticipated event rate for a frame (meaning that less event data is available for transmission to the receiver in the frame than initially anticipated), the imager can (a) insert available event data into a payload of the frame and (b) pad the payload with dummy data until a total amount of data (event data plus dummy data) in the payload is equivalent to the anticipated amount of data communicated to the receiver for that frame. In the event of a higher-than-anticipated event rate for a frame (meaning that more event data is available for transmission to the receiver in the frame than initially anticipated), the imager can limit the amount of event data loaded into a payload of the frame such that a total amount of event data in the payload is equivalent to or does not exceed the anticipated amount of data previously communicated to the receiver. Excess event data not included in the payload can be discarded or stored in memory for transmission to the receiver in a different frame. In these and other embodiments, the imagers can foresee the need for a differently sized frame than initially anticipated, and can send the receiver a revised or updated anticipated amount of data for a frame prior to transmitting the frame. This can allow the receiver to adjust its local receiver circuit and/or controllers to accommodate receiving the differently sized frame.

In this manner, the present technology facilitates informing a synchronous communications receiver about an expected size of a frame prior to transmitting that frame from a synchronous communications transmitter of an imager to the receiver. In turn, the present technology enables the receiver to update its local receiver circuit and controller in advance of receiving the frame, thereby minimizing the likelihood of timing specification issues and therefore the likelihood of the synchronous communications interface aborting transmission of the frame. In other words, the present technology bounds latency variability to facilitate asynchronously sending, via a synchronous communications interface, event data to a synchronous communications receiver while reducing the likelihood of event data loss or frame loss. In addition, by facilitating scaling of frame sizes received by the receiver, the present technology reduces the amount of dummy data transmitted to the receiver as padding that may otherwise be sent to the receiver in implementations that employ a fixed frame size.

B. Selected Embodiments of Imaging Systems and Associated Methods of Transmitting Asynchronous Event Data Via Synchronous Communications Interfaces Using Anticipated Event Rates FIG. 1 is a partially schematic block diagram of an imaging system 100 configured in accordance with various embodiments of the present technology. As shown, the imaging system 100 includes an imager 110 and a synchronous communications receiver or application processor 120 ("the receiver 120"). Although shown as a MIPI receiver 120 in the embodiment illustrated in FIG. 1, the receiver 120 can be another suitable synchronous communications receiver or application processor in other embodiments.

The imager 110 includes an array 102 of event vision pixels, row control circuitry 104, column control circuitry 106, an event signal processor 108, a synchronous communications transmitter 116 ("the transmitter 116"), and a filter/predictor block or circuit 114 ("predictor block 114"). Although shown as a MIPI transmitter 116 in the embodiment illustrated in FIG. 1, the transmitter 116 can be another suitable synchronous communications transmitter in other embodiments.

In some embodiments, the imager 110 can additionally include a memory 112. The memory 112 is shown as a FIFO buffer 112 in FIG. 1 as an example. In other embodiments, the memory 112 can be another suitable type of buffer or memory. Although shown as being positioned between the event signal processor 108 and the transmitter 116, the memory 112 can be omitted or can be positioned at other locations within the imager 110 in other embodiments. For example, the memory 112 can be positioned within (and therefore be a part of) the event signal processor 108 or the transmitter 116 in some embodiments, or the memory 112 can be positioned after the transmitter 116 (e.g., such that the transmitter 116 is positioned between the event signal processor 108 and the memory 112).

The array 102 of event vision pixels in the imager 110 includes a plurality of event vision pixel circuits (not shown in FIG. 1) arranged in rows and columns. As discussed above, event vision pixels are configured to capture changes (e.g., events) in an external scene. To this end, each event vision pixel can include (i) a photosensor, such as a photodiode, configured to photogenerate charge or photocurrent in response to incident light received from the external scene; (ii) a photocurrent-to-voltage converter coupled to the photosensor to convert photocurrent generated by the photosensor to a voltage; and (iii) a filter amplifier coupled to the photocurrent-to-voltage converter to generate a filtered and amplified signal in response to the voltage received from the photocurrent-to-voltage converter. The event vision pixels can further include a threshold comparison circuit or stage to generate and receive handshake signals in response to events asynchronously detected in incident light received from the external scene. Alternatively, a threshold comparison circuit may be included in circuitry (e.g., in the event signal processor 108) peripheral or external to the event vision pixels of the array 102, such as within column read out circuitry.

Figure 2:
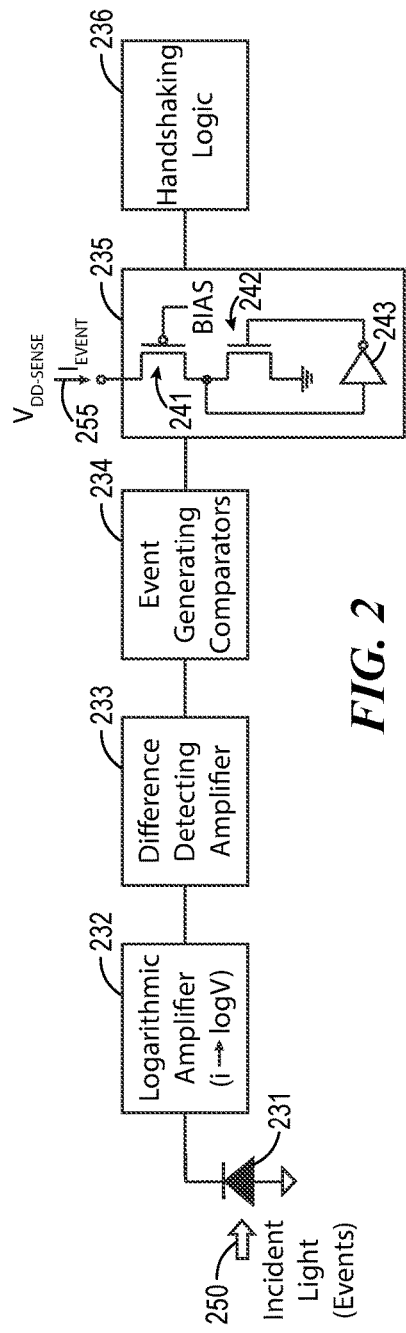
FIG. 2 is a partially schematic block diagram illustrating an event vision pixel configured in accordance with various embodiments of the present technology.

FIG. 2 is a partially schematic block diagram illustrating an example of an event vision pixel 230 configured in accordance with various embodiments of the present technology. It is appreciated that the illustrated event vision pixel circuit 230 may be a block diagram example of one of the event vision pixel circuits included in the array 102 of FIG. 1, or another event vision pixel circuit of the present technology. As shown, the event vision pixel 230 includes a photodiode 231 configured to photogenerate charge or photocurrent in response to incident light 250 received from an external scene. The photodiode 231 is coupled to a logarithmic amplifier 232 that is configured to convert photocurrent generated by the photodiode 231 to a voltage. In various examples, the logarithmic amplifier 232 is configured to generate the voltage by transducing the momentary photocurrent received from the photodiode 231. A difference detecting amplifier 233 is coupled to the logarithmic amplifier 232 to generate a filtered and amplified signal in response to differences that are detected in the voltage received from the logarithmic amplifier 232. In one example, the difference detecting amplifier 233 is configured to compare the momentary log-intensity of the voltage output of the logarithmic amplifier 232 with a reference level based on a reset condition or a last event. Event generating comparators 234 are coupled to the difference detecting amplifier 233 to compare the filtered and amplified signal received from the difference detecting amplifier 233 with thresholds to asynchronously detect events that occur in the external scene in response to the incident light 250. In one example, the event generating comparators 234 are configured to discriminate if said signal difference is significant enough to trigger an event.

The event vision pixel 230 optionally includes a latch 235 coupled to the event generating comparators 234 to store events detected by the event generating comparators 234 until they can be read by handshaking logic 236 to interface with peripheral circuitry. The latch 235 illustrated in FIG. 2 includes a first transistor 241, a second transistor 242, an inverter 243, and a $V_{DD\text{-}SENSE}$ terminal. In the example, the first transistor 241 is a PMOS transistor and the second transistor 242 is an NMOS transistor. A first terminal of the first transistor 241 is coupled to a first terminal of the second transistor 241. A second terminal of the first transistor 241 is coupled to the $V_{DD\text{-}SENSE}$ terminal, and a second terminal of the second transistor 242 is coupled to ground. An input of the inverter 243 is coupled to the first terminals of the first and second transistors 241 and 242. An output of the inverter 243 is coupled to a gate terminal of the second transistor 242. A gate terminal of the first transistor 243 is coupled to receive a bias voltage BIAS.

It is appreciated that the example latch 235 illustrated in FIG. 2 is implemented with a current-starved bit-keeper. In some embodiments, an event is detected when the output of the inverter 243 turns on the second transistor 242, which causes an event current $I_{EVENT}$ 255 to flow through the first transistor 241 and the second transistor 242. The latch 235 can therefore be sensed through the $V_{DD\text{-}SENSE}$ terminal and/or via the event current $I_{EVENT}$ 255. With the gate of the first transistor 241 tied to the bias voltage BIAS, the event current $I_{EVENT}$ 255 can be a distinct current consumption (e.g., a unit current) that is conducted through the latch 235 in response to the event being detected in the event vision pixel circuit 230. In one example, the event current $I_{EVENT}$ 255 is conducted through the latch 235 if and only if an event is detected in the event vision pixel circuit 230. In some embodiments, the event current $I_{EVENT}$ 255 may have a predetermined value. Additional details regarding event vision pixel circuits incorporating latches with current-starved bit-keepers are provided in U.S. Pat. No. 11,563,909, which is incorporated by reference herein in its entirety.

In operation, when an event occurs in an external scene, that event is indicated in the incident light 250 that is received by the photodiode 231 as a quick or sudden change in intensity or brightness. In other words, if the external scene is static and there is no event occurring, the brightness of incident light 250 remains substantially unchanged. As such, the photocurrent generated by the photodiode 231 remains substantially constant. However, if an event occurs (e.g., movement, changes of illumination, albedo, excitance, etc.) in the external scene, the event is indicated with an asynchronous quick or sudden change in the brightness of incident light 250. The change in brightness can be from darker to brighter or from brighter to darker. As such, there is an asynchronous change or delta in the photocurrent generated by the photodiode 231. The change or delta in the photocurrent is converted to a voltage by the logarithmic amplifier 232, filtered and amplified by the difference detecting amplifier 233, and then detected with the event generating comparators 234. The event can be latched in the latch 235 until it can be read out by the handshaking logic 236.

It is appreciated therefore that an imager (e.g., the imager 110 of FIG. 1) including event vision pixel circuits (e.g., the event vision pixel circuit 230 of FIG. 2) does not need to record an entire regular image, and therefore is not burdened with having to capture and record all of the highly redundant information of a normal image from frame to frame. Rather, in various embodiments, the imager can record only events. For example, the imager can record the location of where an event is detected (e.g., the x-y coordinates of an event vision pixel in the array 102 of FIG. 1), the polarity of change (e.g., brighter or darker) in the photocurrent for that event, and/or a timing corresponding to when the event occurred or was detected. In other words, the imager can be employed to detect movement or motion in an external scene (e.g., as opposed to being employed to capture/read out entire frames of images or video), thereby enabling use of a low data rate and a realization of ultra-high frame rates or speed capabilities in imagers of the present technology.

Referring again to FIG. 1, event data detected by the event vision pixels of the array 102 can be read out from the array 102 asynchronously and/or may be read out in an order that differs from the order in which the event data was generated. In these embodiments, digital time stamps associated with each event occurrence in signals output from the event vision pixels can help to ensure that detected events are processed and/or reconstructed back into the correct order in which the events occurred.

With continuing reference to FIG. 1, the row control circuitry 104 and the column control circuitry 106 are used to control the rows and columns, respectively, of the event vision pixels in the array 102. For example, the row control circuitry 104 and/or the column control circuitry 106 can be configured to reset specific (e.g., individual ones or rows of) event vision pixels of the array 102, and/or to read out (e.g., individual ones or rows of) event vision pixels from the array 102 (e.g., along corresponding column bitlines connected to the event vision pixels).

Figure 3:
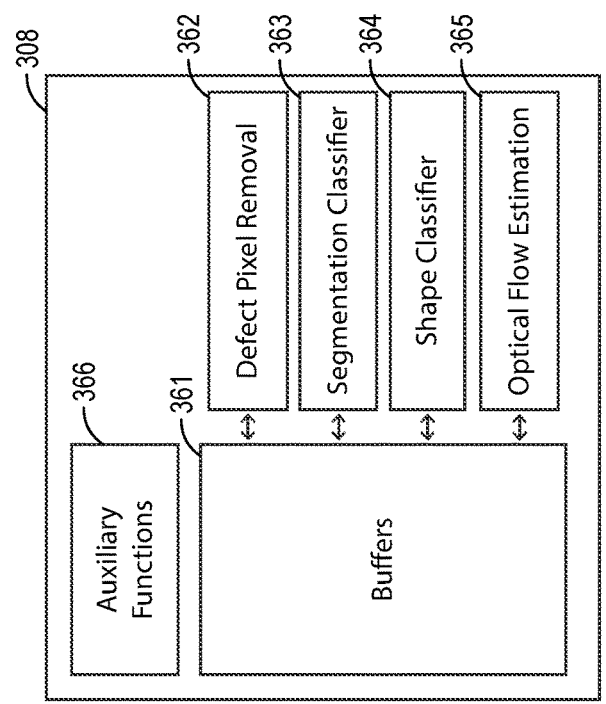
FIG. 3 is a partially schematic block diagram of an event signal processor configured in accordance with various embodiments of the present technology.

Pixel signals read out from event vision pixels of the array 102 can be passed to the event signal processor 108 of the imager 110 for processing. FIG. 3 is a partially schematic block diagram of an event signal processor 308 (e.g., the event signal processor 108 of FIG. 1, or another event signal processor of the present technology) configured in accordance with various embodiments of the present technology. As shown, the event signal processor 308 includes (a) a set of buffers 361 (e.g., a set of line buffers) and (b) several circuits or blocks that are operably coupled to the buffers 361 and that can be used to perform various processing functions. For example, the event signal processor 308 includes a defect pixel removal block 362 that can be used to remove pixel signals corresponding to defective event vision pixels of an array (e.g., the array 102 of FIG. 1); a segmentation classifier block 363 and a shape classifier block 364 that can be used to classify segments and shapes, respectively, of event data read out from the array; and an optical flow estimation block 365 that can be used to identify pixel-wise, shape-wise, or segmentation-wise motions over time and/or between consecutive readouts (e.g., using correlation-based, block-matching-based, feature-tracking-based, energy-based, and/or gradient-based optical flow estimation). As shown, the event signal processor 308 can further include one or more other blocks 366 for performing auxiliary processing functions.

As discussed in greater detail below, information (e.g., shape data, segmentation data, optical flow data, event data, data stored in the buffers 361, etc.) stored, identified, or generated by the event signal processor 308 can be used by a predictor block (e.g., the predictor block 114 of FIG. 1, a predictor block (not shown) of the event signal processor 308, or another predictor block of the present technology) to anticipate (e.g., predict, estimate, identify ahead of time) future event rates and corresponding sizes or amounts of event data that will likely be included in payloads of future frames of event data transmitted to a receiver (e.g., the receiver 120 of FIG. 1). For example, the buffers 361 can be used to store event data corresponding to one or more rows of event vision pixels of an array at a given time and/or over a period of time (e.g., over multiple frames). Thus, the buffers 361 can be leveraged to gather 2D or 3D information relating to the geometrical distribution of detected events (e.g., across one or more rows, across one or more columns, across time, and/or across multiple frames of event data), thereby enabling the predictor block to perform 2D-based or 3D-based event rate prediction. As another example, segmentation data generated by the segmentation classifier block 363, shape data generated by the shape classifier block 364, and/or optical flow data generated by the optical flow estimation block 365 can be stored to the buffers 361 and/or provided to a predictor block. In some embodiments, the buffers 361 can additionally, or alternatively, be used to compress event data read out of the array (e.g., for transmission to the receiver 120 of FIG. 1). The compression may be based at least in part on segmentation data, shape data, and/or optical flow data generated by the segmentation classifier block 363, the shape classifier block 364, and the optical flow estimation block 365, respectively.

Referring again to FIG. 1, event data processed by the event signal processor 108 can be provided to the transmitter 116 for transmitting the event data out of the imager 110 to the receiver 120. Additionally, or alternatively, all or a subset of the event data can be stored in memory 112 (e.g., before or after being provided to the transmitter 116), as described in greater detail below. As shown, the event signal processor 108 additionally provides information to the predictor block 114 that, in turn, uses the information to anticipate one or more future event rates and/or corresponding amounts of event data that will be included in payloads of future frames sent to the receiver 120. Various techniques can be employed by the predictor block 114 to estimate future event rates. As a specific example, the predictor block 114 can include a Kalman filter to generate Kalman-filter-based event rate predictions.

Information provided to the predictor block 114 by the event signal processor 108 can include various data useful for predicting future event rates. For example, the information provided to the predictor block 114 by the event signal processor 108 can include event data. As another example, the information provided to the predictor block 114 by the event signal processor 108 can include a current event rate or an amount of event data (a) included in a payload of a frame currently being transmitted to the receiver 120 or (b) corresponding to one or more frames transmitted to the receiver 120 prior to a future frame of interest for which the predictor block 114 is used to anticipate a corresponding event rate. In these and other embodiments, the information can include one or more previous event rates or one or more amounts of event data included in payloads of one or more frames previously transmitted to the receiver 120.

Figure 4:
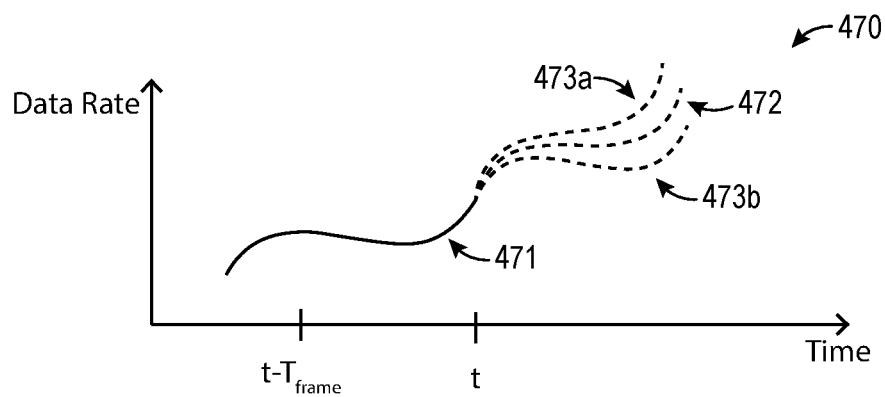
FIG. 4 is a line plot illustrating how historical data of event rates can be used to generate a prediction of event rates at one or more future points in time.

FIG. 4 is a line plot 470 specifically illustrating one example of how the predictor block 114 can use historical data of event rates to generate a prediction of event rates at one or more future points in time. More specifically, the line plot 470 includes a first line segment 471 that represents known event rates corresponding to frames transmitted to the receiver 120 (FIG. 1) between time t-$T_{frame}$ and time t. Using the event rates corresponding to the first line segment 471, the predictor block 114 can extrapolate the first line segment 471 to generate a second line segment 472 representing predicted event rates occurring at points in time occurring after time t. As shown in FIG. 4, the second line segment 472 can be bounded by an upper confidence interval segment 473a and a lower confidence interval segment 473b that can also be generated by the predictor block 114 based at least in part on the event rates corresponding to the first line segment 471.

Information provided to the predictor block 114 by the event signal processor 108 can additionally, or alternatively, include or correspond to event rates for one or more sets of regions in the array 102. For example, the information can include or relate to the geometrical distribution of detected events in the array 102 at a given point in time or over a period of time. As a specific example, the information can include (a) 2D information relating to shapes formed by event vision pixel circuits in the array 102 that have detected events at a given point in time and/or (b) motion or optical flow of those shapes over a period of time (e.g., over multiple frames). As discussed above, buffers (e.g., the buffers 361 of the event signal processor 308 of FIG. 3), other memory (e.g., the memory 112) of the imager 110, and/or various processing blocks (e.g., the blocks 362-365 of the event signal processor 308 of FIG. 3) can be used to store or generate all or a subset of the information to enable the predictor block 114 to perform 2D or 3D event rate prediction. In these embodiments, the predictor block 114 can be configured to read information from or transmit information (e.g., for storage) to the buffers, the other memory of the imager 110, and/or the various processing blocks.

In some embodiments, the predictor block 114 can use 2D event information to predict event rates corresponding to blocks of rows of event vision pixels of the array 102 at future points in time using the following equation:

$$y(t) = \begin{pmatrix} \text{upper confidence interval bound} \\ \text{event rate point estimation} \\ \text{lower confidence interval bound} \end{pmatrix} = \vec{f}(M), \quad \text{Equation 1}$$

$$M = \{\vec{e}(x, u, p, t) \mid u \in [u_0, u_1] \wedge \tau\}$$

More specifically, using Equation 1 above, blocks of rows of event vision pixels in the array 102 can be parameterized through u varying in the interval $[u_0, u_1]$. Events in observed sets of events (represented by M in Equation 1 above) can be parameterized through location x, u; polarity (up/down)

p; and time stamp t. The function $\vec{f}$ in Equation 1 above represents the function employed by the predictor block 114 (e.g., the function employed by a filter of the predictor block 114) on the sets of events M that provides estimates of data rate, event rate, frame size, etc.

In these and other embodiments, the predictor block 114 can use 2D event information to predict event rates corresponding to a single row of event vision pixels of the array 102 at future points in time using the following equation:

$$y(t) = \begin{pmatrix} \text{upper confidence interval bound} \\ \text{event rate point estimation} \\ \text{lower confidence interval bound} \end{pmatrix} = \vec{f}(M), \quad \text{Equation 2}$$

$$M = \{\vec{e}(x, u, p, t) \mid u = y \; \forall \; x, y, p, t\}$$

More specifically, using Equation 2 above a single row of event vision pixels in the array 102 can be parameterized through u that here directly corresponds to a single value y (as opposed to an interval $[u_0, u_1]$, as it does in Equation 1 above). Similar to Equation 1 above, events in observed sets of events M in Equation 2 can be parameterized through location x, u; polarity (up/down) p; and time stamp t. The function $\vec{f}$ in Equation 2 remains representative of the function employed by the predictor block 114 on the sets of events M that provides estimates of data rate, event rate, frame size, etc.

In these and still other embodiments, the predictor block 114 can anticipate future event rates based on other information, such as on indications of a global activity rate of event vision pixels in the array 102 at given points in time or over given periods of time. For example, as discussed above, event vision pixels in the array 102 can include current-starved bit-keeper latches (e.g., similar to the latch 235 of FIG. 2) that each generate a unit current if and only if the corresponding event vision pixel detects an event. Therefore, the sum of the unit currents across the array 102 at a given point in time or over a period of time can provide an indication of global activity of event vision pixels in the array 102. In some embodiments, the imager 110 can include an activity monitor circuit (not shown in FIG. 1) that is configured to use the sum of the unit currents generated by the event vision pixels across the array 102 to provide the predictor block 114 an indication of a global activity rate of event vision pixels in the array at given points in time.

Figure 5:
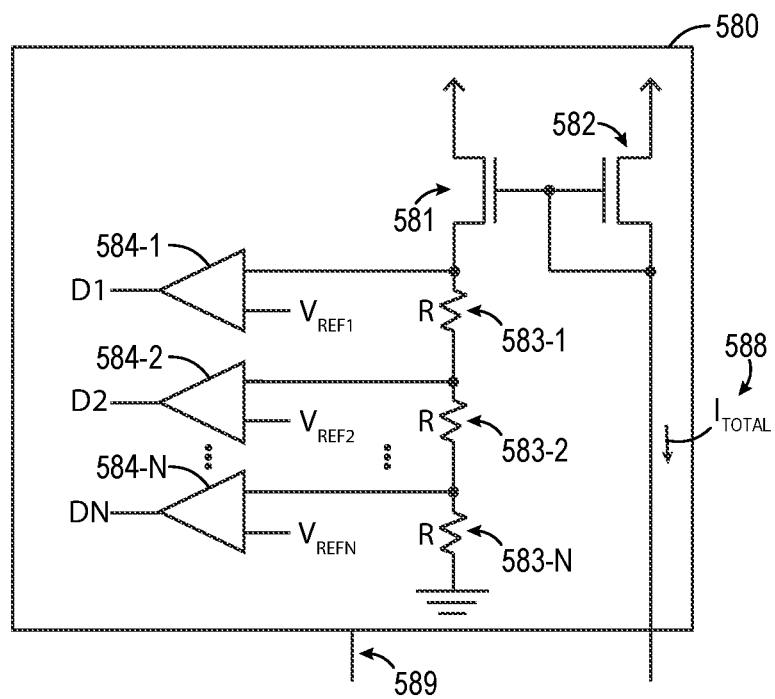
FIG. 5 is a partially schematic bock diagram of an activity monitor circuit configured in accordance with various embodiments of the present technology.

FIG. 5 is a partially schematic bock diagram of one example of an activity monitor circuit 580 that is configured in accordance with various embodiments of the present technology. As shown, the activity monitor circuit 580 includes an analog-to-digital converter (ADC) implemented with a current mirror. The current mirror includes a first transistor 581 and a second transistor 582. The drains of the first and second transistors 581 and 582 are coupled to a supply voltage, and the gates of the first and second transistors 581 and 582 are coupled together and to the source of the second transistor 582. The source of the second transistor 582 is configured (a) to be coupled to all of the event vision pixel circuits of a pixel array (e.g., the array 102 of FIG. 1) and (b) to conduct a total current $I_{TOTAL}$ 588. The source of the first transistor 581 is coupled to a voltage divider that includes a plurality of resistors 583-1, 583-2, . . . 583-N coupled in series. Each one of the plurality of resistors 583-1, 583-2, . . . 583-N is coupled to a respective one of a plurality of comparators 584-1, 584-2, . . . 584-N. Each one of the plurality of comparators 584-1, 584-2 . . . 584-N is also coupled to a respective reference voltage $V_{REF1}, V_{REF2}, \ldots V_{REFN}$ and is configured to generate a respective digital output signal D1, D2, . . . DN, as shown. In the example, it is appreciated that the digital output signals provided with D1, D2, . . . DN is a digital temperature code representative of the total current $I_{TOTAL}$ 588. More specifically, it is appreciated that the current mirror included in the activity monitor circuit 580 mirrors the total current $I_{TOTAL}$ 588 into the current path that includes the voltage divider provided with the plurality of resistors 583-1, 583-2, . . . 583-N. The mirrored current through the plurality of resistors 583-1, 583-2 . . . 583-N generates corresponding voltage drops across each one of the plurality of resistors 584-1, 584-2, . . . 584-N, which generate the digital output signals D1, D2, . . . DN at the outputs of the plurality of comparators 584-1, 584-2, . . . 584-N depending on whether the respective reference voltages $V_{REF1}, V_{REF2}, \ldots V_{REFN}$ are exceeded. In the illustrated example, the activity monitor circuit 580 is configured (a) to generate an activity monitor signal at an output 589 of the activity monitor circuit 580 responsive to the digital output signals D1, D2, . . . DN and (b) to provide the activity monitor signal to a predictor block (e.g., the predictor block 114 of FIG. 1) coupled to the output 589. Thus, the activity monitor circuit 580 can be separate from but coupled to the predictor block. In other embodiments, the activity monitor circuit 580 can be incorporated into the predictor block.

Referring to FIGS. 1 and 5 together, each event vision pixel circuit of the array 102 (FIG. 1) in one example can, via their respective latches (latches 235; FIG. 2), contribute a unit current having a predetermined value when the event vision pixel circuit is fired. Unit currents from all of the event vision pixel circuits of the array 102 can be summed into a total current $I_{TOTAL}$ 588 (FIG. 5) that is monitored by the activity monitor circuit 580 (FIG. 5). The total current $I_{TOTAL}$ 588 can therefore be representative of the total number of event vision pixel circuits that are being fired in the array 102. Because each event vision pixel circuit of the array 102 can be configured in such a way as to generate a distinct current consumption having a predetermined value on a reference supply if and only if an event is detected by the respective event vision pixel circuit, the total current $I_{TOTAL}$ 588 can provide an indication of global activity of only those event vision pixels of the array 102 that have detected events. Based at least in part on the total current $I_{TOTAL}$ 588, the activity monitor circuit 580 can generate an activity monitor signal at its output 589 that is provided to the predictor block 114. In turn, the predictor block 114 can predict a future event rate based at least in part on the activity monitor signal received from the activity monitor circuit 580. For example, the predictor block 114 can estimate a future event rate based on the activity monitor signal using the following equation:

$$y(t) = \begin{pmatrix} \text{upper confidence interval} \\ \text{event rate point estimation} \\ \text{lower confidence interval} \end{pmatrix} = \vec{f}\left(\frac{1}{\Delta T}\int_{t-\Delta T}^{t}\delta_{\vec{e}(t)} \cdot dt\right) \quad \text{Equation 3}$$

In Equation 3 above, δ is some distribution that yields an increment of one (1) when integrating over it for each event, and ΔT is a given interval over which unit currents are summed to measure global activity of event vision pixels in the array 102.

It is appreciated that although the activity monitor circuit 580 is illustrated in FIG. 5 as including the specific type of analog-to-digital converter shown, the activity monitor circuit 580 may be implemented with other types of analog-to-digital converters in other embodiments of the present technology. For example, the activity monitor circuit 580 may be implemented so as to directly operate on the total current $I_{TOTAL}$ 588. In these embodiments, the activity monitor circuit 580 may be implemented using other analog-to-digital circuit configurations (e.g., ramp slope, SAR, sigma-delta, etc.) depending on latency, power, area, accuracy, performance, or other requirements. Additional details regarding activity monitor circuits and imagers implementing the same are provided in U.S. Pat. No. 11,563,909, which was previously incorporated herein by reference above.

After generating an anticipated event rate for a future frame, the predictor block 114 can provide the anticipated event rate to the transmitter 116 for transmission to the receiver 120. In some embodiments, the transmitter 116 can transmit the anticipated event rate for a future frame to the receiver 120 by including the anticipated event rate in a header portion of a current frame being transmitted to the receiver 120. As described in greater detail below with reference to FIGS. 8 and 9, the transmitter 116 can alternatively provide the anticipated event rate for a future frame to the receiver 120 by loading the anticipated event rate into a local register coupled to the transmitter 116. In turn, the receiver 120 can read the anticipated event rate from the local register via an interface, such as an inter-integrated circuit (I2C) interface, a serial peripheral interface (SPI), or another suitable interface coupling the receiver 120 to the local register. In these and still other embodiments, any other suitable method can be used to communicate the anticipated event rate to the receiver 120.

Once the receiver 120 has received the anticipated event rate for the future frame, the receiver 120 can use the anticipated event rate to update its local receiver circuit and controller (e.g., memory controller or processor controlling the synchronous communications interface) in advance of receiving the corresponding future frame from the transmitter 116 such that the receiver 120 is configured to receive a frame having a payload size corresponding to the anticipated event rate. When the time comes for the imager 110 to transmit the future frame to the receiver 120, the imager 110 (e.g., the event signal processor 108, the predictor block 114, and/or the transmitter 116) can determine whether the actual amount of event data available for transmission in the frame is greater or lesser than the predicted amount of event data corresponding to the predicted event rate. In the event that the event rate is lower than the anticipated event rate (meaning that less event data has been generated for transmission to the receiver 120 than anticipated), the imager 110 (e.g., the event signal processor 108 and/or the transmitter 116) can pad the frame with dummy data such that an amount of data (e.g., event data plus dummy data) transmitted to the receiver 120 is equivalent to the predicted amount of event data corresponding to the predicted event rate that was previously communicated to the receiver 120. On the other hand, when the event rate is higher than the anticipated event rate (meaning that more event data has been generated for transmission to the receiver 120 than anticipated), the imager 110 (e.g., the event signal processor 108 and/or the transmitter 116) can (a) drop, filter, or compress out event data until the amount of event data transmitted to the receiver 120 corresponds to the event rate previously communicated to the receiver 120 and/or (b) save excess event data in a buffer (e.g., in the memory 112) for later transmission to the receiver 120 in a separate frame.

Additionally, or alternatively, the imager 110 (e.g., the event signal processor 108, the predictor block 114, and/or the transmitter 116) can foresee the need for a larger frame size (e.g., based on information provided to or generated by the event signal processor 108, the activity monitor circuit, and/or the predictor block 114) and can communicate that need to the receiver 120 prior to transmission of the future frame such that the receiver 120 can accommodate a frame size larger than initially anticipated and communicated by the imager 110.

In this manner, the present technology facilitates informing the receiver 120 about an expected size of a frame prior to transmitting that frame from the imager 110 to the receiver 120. In turn, the present technology enables the receiver 120 to update its local receiver circuit and controller in advance of receiving the frame, thereby minimizing the likelihood of timing specification issues and therefore the likelihood of the synchronous communications interface aborting transmission of the frame. In other words, the present technology facilitates asynchronously sending, via a synchronous communications interface, event data to a synchronous communications receiver while reducing the likelihood of event data loss or frame loss. In addition, by facilitating scaling of frame sizes received by the receiver 120, the present technology reduces the amount of dummy data transmitted to the receiver 120 as padding that may otherwise be sent to the receiver 120 in implementations that employ a fixed frame size.

Figure 6A:
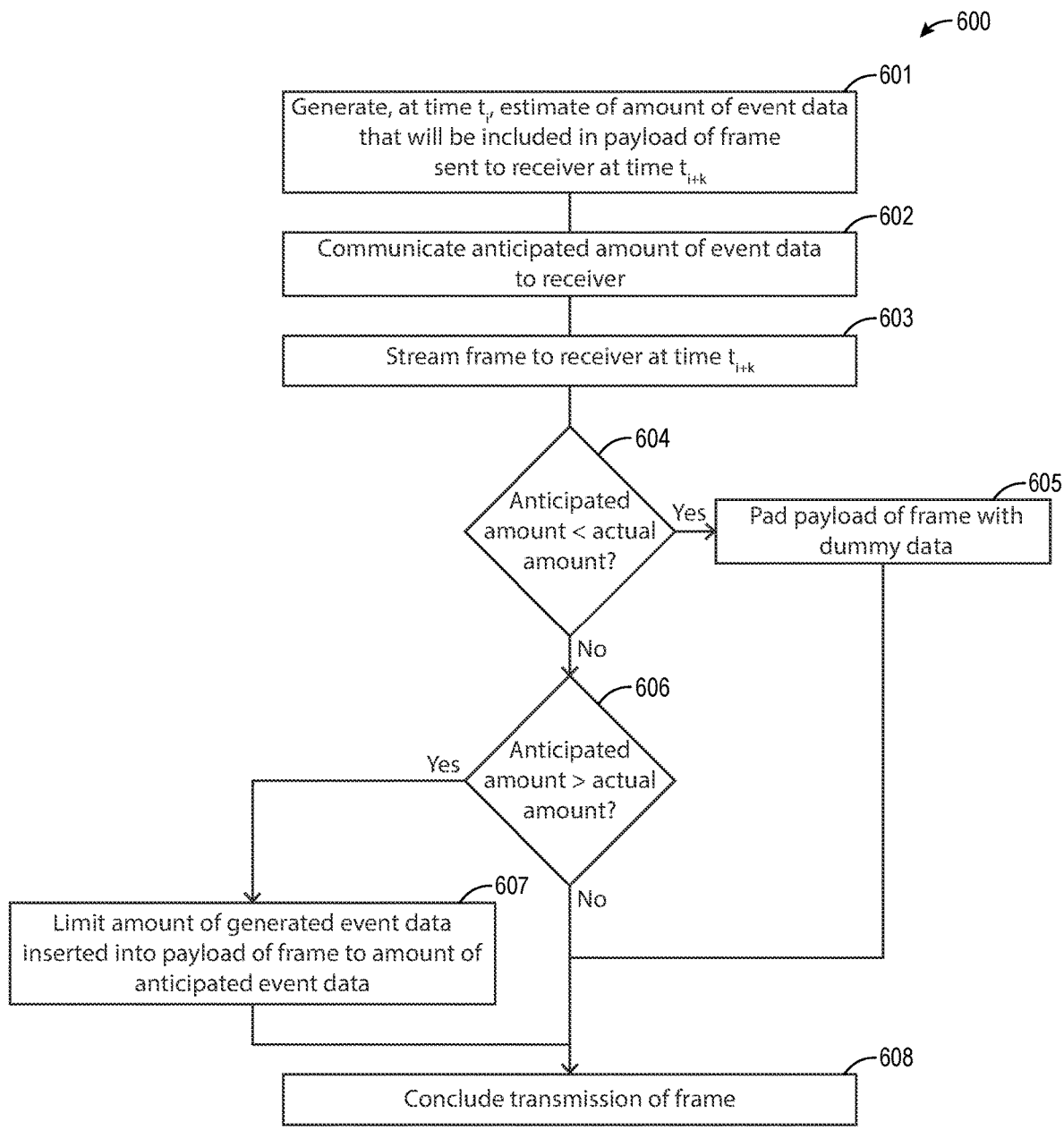
FIG. 6A is a flow diagram illustrating a method of operating an imager of an imaging system in accordance with various embodiments of the present technology.

FIG. 6A is a flow diagram illustrating a method 600 of operating the imaging system 100 of FIG. 1 in accordance with various embodiments of the present technology. The method 600 can be employed, for example, to transmit asynchronous event data from the imager 110 to the receiver 120 of the imaging system 100 via a synchronous communications interface formed at least in part by the transmitter 116 of the imager 110 and the receiver 120. The method 600 is illustrated as a set of steps or blocks 601-608. All or a subset of one or more of the blocks 601-608 can be executed by various components of the imaging system 100. For example, all or a subset of one or more of the blocks 601-608 can be executed by (i) the array 102 of event vision pixels, (ii) the row control circuitry 104, (iii) the column control circuitry 106, (iv) the event signal processor 108, (v) the memory 112, (vi) the predictor block 114, (vii) the transmitter 116, and/or (viii) an activity monitor circuit (e.g., the activity monitor circuit 580 of FIG. 5). Furthermore, any one or more of the blocks 601-608 can be executed in accordance with the discussion of FIGS. 1-5 above. The method 600 of FIG. 6A is discussed in part below with reference to FIG. 7 that illustrates a timing diagram 720 of transmission of a first frame (frame i) of data, a second frame (frame i+1) of data, and a third frame (frame i+x) of data from the transmitter 116 of FIG. 1 to the receiver 120 of FIG. 1.

The method 600 of FIG. 6A begins at block 601 by generating, at time $t_i$, an estimate of an amount of event data that will be included in a payload of a frame sent to the receiver 120 at time $t_{i+k}$. In some embodiments, the estimate can be generated by the predictor block 114 based at least in part on (i) information received or retrieved from the event signal processor 108 and/or (ii) information received from an activity monitor circuit, such as the activity monitor circuit 580 of FIG. 5. As discussed above, the information can include event data; a current event rate or an amount of event data included in a payload of a frame currently being transmitted to the receiver 120; one or more previous event rates or one or more amounts of event data included in payloads of one or more frames previously transmitted to the receiver 120 or transmitted to the receiver 120 prior to transmitting the frame corresponding to time $t_{i+k}$; information related to the geometrical distribution of detected events in the array 102, such as 2D information relating to shapes formed by event vision pixel circuits in the array 102 that have detected events at a given point in time, motion or optical flow of those shapes over a period of time, or segmentation data; and/or an indication of global activity of event vision pixels of the array 102 that have detected events. In these and other embodiments, information can include accuracy of previously generated estimates. For example, if the imager 110 (e.g., the event signal processor 108, the predictor block 114, and/or the transmitter 116) determines that actual amounts of event data generated by the event vision pixels are routinely greater than the corresponding predicted amounts of event data, the imager 110 can adjust an estimate of the amount of event data generated at block 601 toward the upper confidence interval value to increase the likelihood that the actual amount of event data is more closely aligned with the corresponding predicted amount of event data. Similarly, if the imager 110 determines that actual amounts of event data generated by the event vision pixels are routinely lesser than the corresponding predicted amounts of event data, the imager 110 can adjust an estimate of the amount of event data generated at block 601 toward the lower confidence interval value to increase the likelihood that the actual amount of event data is more closely aligned with the corresponding predicted amount of event data. In some embodiments, generating the estimate can include generating an estimate of an anticipated event rate corresponding to the frame transmitted to the receiver 120 at time $t_{i+k}$. Additionally, or alternatively, generating the estimate can include generating an estimate of how the detection of events will be distributed across the array 102 at time $t_{i+k}$. In some embodiments, the estimated distribution can yield an estimate for group encodings, such as compression techniques that are based on local similarities of events.

At block 602, the method 600 continues by communicating the anticipated amount of event data from block 601 to the receiver 120. In some embodiments, communicating the anticipated amount of event data to the receiver 120 includes communicating the anticipated amount of event data to the receiver 120 in a current frame being transmitted to the receiver 120. For example, communicating the anticipated amount of event data can include inserting an indication of the anticipated amount of event data and/or of a corresponding event rate into a header portion of the current frame.

In some embodiments, the method 600 can return to block 601 after communicating the anticipated amount of event data at block 602. For example, the method 600 can return to block 601 to generate, at a time occurring after time $t_i$, an estimate of an amount of event data that will be included in a payload of a frame sent to the receiver 120 at time $t_{i+2k}$. Thereafter, the method 600 can proceed again to block 602 to communicate the anticipated amount of event data for the frame corresponding time $t_{i+2k}$ to the receiver 120.

At block 603, the method 600 continues by streaming the frame corresponding to time $t_{i+k}$ to the receiver 120. Streaming the frame can include inserting data (e.g., event data and/or dummy data) into a payload of the frame and transmitting the frame to the receiver 120 via the transmitter 116. In some embodiments, streaming the frame can include inserting, into a header portion of the frame corresponding to time $t_{i+k}$, an anticipated amount of event data that will be included in a payload of a future frame streamed to the receiver 120.

Figure 7:
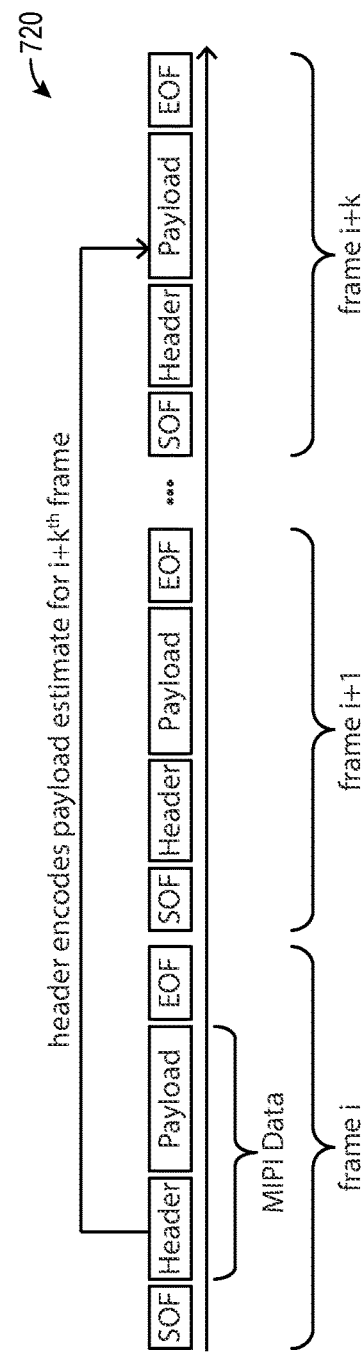
FIG. 7 is a timing diagram illustrating transmission of a first frame of data, a second frame of data, and a third frame of data to a receiver in accordance with various embodiments of the present technology.

Referring now to the timing diagram 720 illustrated in FIG. 7 as an example of the method 600 of FIG. 6A, the imager 110 transmits three frames (frame i, frame i+1, and a frame i+k) to the receiver 120. Each of the frames includes a start of frame (SOF) identifier portion, a header portion, a payload portion, and an end of frame (EOF) identifier portion. As shown, the imager 110 loads a header portion of frame i with an indication of an anticipated event rate (or of a corresponding anticipated amount of event data) for frame i+k such that the indication is received by the receiver 120 before frame i+k is transmitted from the imager 110 to the receiver 120. In turn, the receiver 120 adjusts its local receiver circuit and controller in anticipation of receiving frame i+k from the imager 110 to accommodate frame i+k with a payload having a size corresponding to the anticipated event rate communicated to the receiver 120 in frame i. In some embodiments, the receiver 120 may require a few cycles to adjust its local receiver circuit and memory controller. Thus, in the illustrated example, the imager 110 transmits at least frame i+1 to the receiver 120 after transmitting frame i and before transmitting frame i+k to the receiver 120. During this period, frame time or latency specifications used for transmitting the frames between frame i and frame i+k (including frame i+1) to the receiver 120 can remain constant (e.g., the same as or similar to the frame time or latency specifications used for transmitting frame i to the receiver 120). In other embodiments, the receiver 120 may not require a few cycles to adjust its local receiver circuit and controller in anticipation of receiving frame i+k. For example, the receiver 120 may receive the indication of the anticipated event rate for frame i+k in the header portion of frame i, and may be able to adjust its local receiver circuit and memory controller prior to receiving the payload of frame i+k. In these embodiments, frame i+k can be transmitted after frame i and without transmitting other frames between frame i and frame i+k. In other words, the imager 110 can transmit frame i+k to the receiver 120 immediately follow frame i such that frame i+k is frame i+1.

Referring again to FIG. 6A, the method 600 continues at block 604 by determining whether the generated amount of event data available for insertion into the payload of the frame corresponding to time $t_{i+k}$ is less than the amount of event data anticipated at block 601 and communicated to the receiver 120 at block 602. The method 600 can determine whether the generated amount of event data is less than the anticipated amount of event data when the method 600 begins streaming the frame corresponding to time $t_{i+k}$ to the receiver 120 or while streaming the frame to the receiver 120. When the method 600 determines that the generated amount of event data is less than the anticipated amount of event data (block 604: Yes), the method 600 proceeds to block 605 and pads the payload of the frame corresponding to time $t_{i+k}$ with dummy data such that an amount of data (event data plus dummy data) included in the payload of the frame corresponding to time $t_{i+k}$ aligns with the anticipated amount of event data communicated to the receiver 120 at block 602. In some embodiments, dummy data can be encoded differently from event data so that the dummy data can be later distinguished from event data (e.g., at the receiver 120). For example, the dummy data can include (i) a unique header or (ii) a header encoded in a unique format. The unique header or the unique header encoding format used for dummy data can be different from a header or a header encoding format, respectively, that is/are used to identify event data. After padding the payload of the frame with dummy date, the method 600 then proceeds to block 608 to conclude transmission of the frame to the receiver 120. On the other hand, when the method 600 determines that the generated amount of event data is not less than the anticipated amount of event data (block 604: No), the method 600 proceeds to block 606.

At block 606, the method 600 continues by determining whether the generated amount of event data available for insertion into the payload of the frame corresponding to time $t_{i+k}$ is greater than the amount of event data anticipated at block 601 and communicated to the receiver 120 at block 602. When the method 600 determines that the generated amount of event data is greater than the anticipated amount of event data (block 606: Yes), the method 600 proceeds to block 607. On the other hand, when the method 600 determines that the generated amount of event data is not greater than the anticipated amount of event data (block 606: No), the method 600 proceeds to block 608 to conclude transmission of the frame to the receiver 120.

At block 607, the method 600 limits the amount of generated event data inserted into the payload of the frame corresponding to time $t_{i+k}$ to the amount of event data anticipated at block 601 and communicated to the receiver 120 at block 602. In some embodiments, limiting the amount of generated event data can include dropping or filtering at least a subset of the generated event data. For example, the method 600 can insert generated event data into the payload of the frame until an amount of generated event data in the payload aligns with the anticipated amount of event data. Continuing with this example, excess event data that has been generated but has not been loaded into the payload can be omitted from transmission to the receiver 120 in the frame corresponding to time $t_{i+k}$. Generated event data can be loaded into the payload of the frame in the order that it arrives such that generated event data arriving after the payload has been loaded with an amount of event data equivalent to the anticipated amount of event data is omitted from transmission to the receiver 120 in the frame corresponding to time $t_{i+k}$. In these and other embodiments, generated event data can be randomly selected for inclusion in or exclusion from the payload of the frame corresponding to time $t_{i+k}$. In these and still other embodiments, generated event data can be selected for inclusion in or exclusion from the payload based at least in part on spatial and/or temporal occurrence of detected events across the array 102 of event vision pixels. Additionally, or alternatively, limiting the amount of generated event data can include compressing the event data to reduce a total amount of generated event data to closer to the anticipated amount of event data. Other suitable techniques for inserting a subset of the generated event data into the payload of the frame while excluding generated event data in excess of the anticipated amount of event data are of course possible and fall within the scope of the present technology. Excess event data this is not included in the payload of the frame corresponding to time $t_{i+k}$ for transmission to the receiver 120 can be discarded in some embodiments. Alternatively, excess event data that is not included in the payload of the frame for transmission to the receiver 120 can be stored in memory (e.g., the memory 112) for later transmission to the receiver 120 in a payload of another frame. After limiting the amount of generated event data inserted into the payload of the frame corresponding to time $t_{i+k}$, the method 600 continues to block 608 to conclude transmission of the frame to the receiver 120.

Although the blocks 601-608 of the method 600 are discussed and illustrated in a particular order, the method 600 illustrated in FIG. 6A is not so limited. In other embodiments, the method 600 can be performed in a different order. In these and other embodiments, any of the blocks 601-608 of the method 600 can be performed before, during, and/or after any of the other blocks 601-608 of the method 600. For example, blocks 604, 605, 606, and/or 607 can be performed while streaming at least a portion of the frame corresponding to time $t_{i+k}$ to the receiver 120 at block 603. As another example, blocks 601 and 602 can be performed while streaming the frame corresponding to time $t_{i+k}$ to the receiver 120 at block 603-608, to anticipate event rates corresponding to frames that will be transmitted to the receiver 120 in the future. Moreover, a person of ordinary skill in the relevant art will recognize that the illustrated method 600 can be altered and still remain within these and other embodiments of the present technology. For example, one or more blocks 601-608 of the method 600 can be omitted and/or repeated in some embodiments. As a specific example, one or more of blocks 604-607 can be omitted in some embodiments.

As another example, the method 600 can, in some embodiments, foresee a need for a larger or smaller frame size prior to transmission of the frame corresponding to time $t_{i+k}$ to the receiver 120. For example, the predictor block 114 can anticipate that the anticipated amount of event data initially communicated to the receiver 120 at block 602 will likely be less than or greater than an actual amount of event data generated for the frame corresponding to time $t_{i+k}$. Thus, in these embodiments, the predictor block 114 can revise the anticipated amount of event data initially communicated to the receiver 120 at block 602 by generating a new anticipated amount of event data for the frame corresponding to time $t_{i+k}$, and communicating the newly anticipated amount of event data to the receiver 120 prior to transmission of the frame corresponding to time $t_{i+k}$ to the receiver 120. The newly anticipated amount of event data can be based at least in part on new information made available the predictor block 114 after communicating the initial estimate of the amount of event data to the receiver 120. The new information can include, for example, information demonstrating an uptick or downtick in the event rate prior to the transmission of the frame corresponding to time $t_{i+k}$ to the receiver 120, among other information such as excess event data that was generated for but excluded from transmission to the receiver 120 within a previous frame. Communication of the newly anticipated amount of event data to the receiver 120 prior to transmission of the frame corresponding to the time $t_{i+k}$ can reduce the likelihood that the method 600 determines that the generated amount of event data available for insertion into the payload of the frame corresponding to time $t_{i+k}$ (i) is less than the anticipated amount of event data (block 604: Yes), or (ii) is greater than the anticipated amount of event data (block 606: Yes).

Figure 6B:
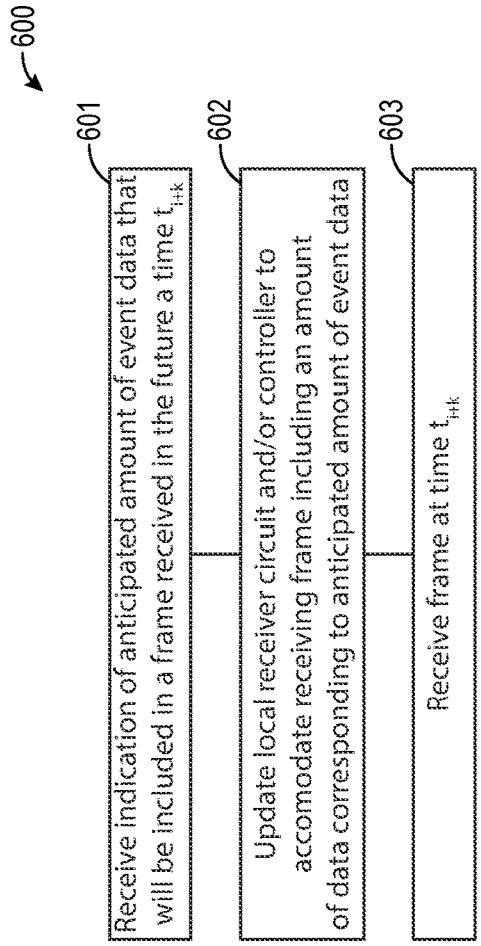
FIG. 6B is a flow diagram illustrating a method of operating a receiver of an imaging system in accordance with various embodiments of the present technology.

FIG. 6B is a flow diagram illustrating a method 690 of operating the receiver 120 of FIG. 1 in accordance with various embodiments of the present technology. The method 690 can be employed, for example, to receive asynchronous event data from the imager 110 of the imaging system 100 via a synchronous communications interface formed at least in part by the transmitter 116 of the imager 110 and the receiver 120. The method 600 is illustrated as a set of steps or blocks 691-693. All or a subset of one or more of the blocks 691-693 can be executed by various components of the receiver 120. For example, all or a subset of one or more of the blocks 691-693 can be executed by (i) a local receiver circuit of the receiver 120 and/or (ii) a controller of the receiver 120 (e.g., a memory controller or a processor controlling the synchronous communications interface coupling the imager 110 to the receiver 120). Furthermore, any one or more of the blocks 691-693 can be executed in accordance with the discussion of FIGS. 1-6A and 7 above.

The method 690 of FIG. 6B begins at block 691 by receiving an indication of an anticipated event rate or an anticipated amount of event data that will be included in a frame transmitted to the receiver 120 from the imager 110 at time $t_{i+k}$. In some embodiments, the indication can be received at the receiver 120 in a header portion of a frame transmitted to the receiver 120 at time $t_i$.

At block 692, the method 690 continues by updating the local receiver circuit and/or a controller (e.g., a memory controller or a processor controlling the synchronous interface coupling the transmitter 116 to the receiver 120) of the receiver 120 to accommodate receiving an amount of data corresponding to the anticipated event rate. For example, the receiver 120 can adjust the local receiver circuit and/or the controller to receive a frame at time $t_{i+k}$ having a payload with an amount of data corresponding to the anticipated event rate received at block 691.

At block 693, the method 690 continues by receiving the frame at time $t_{i+k}$ from the imager 110. In some embodiments, the frame has a payload filled with an amount of data corresponding to the anticipated event rate. Data included in the payload can include event data detected by the imager 110 and/or dummy data used by the imager 110 to pad the payload of the frame.

Although the blocks 691-693 of the method 690 are discussed and illustrated in a particular order, the method 690 illustrated in FIG. 6B is not so limited. In other embodiments, the method 690 can be performed in a different order. In these and other embodiments, any of the blocks 691-693 of the method 690 can be performed before, during, and/or after any of the other blocks 691-693 of the method 690. Moreover, a person of ordinary skill in the relevant art will recognize that the illustrated method 690 can be altered and still remain within these and other embodiments of the present technology. For example, one or more blocks 691-693 of the method 690 can be omitted and/or repeated in some embodiments.

Figure 8:
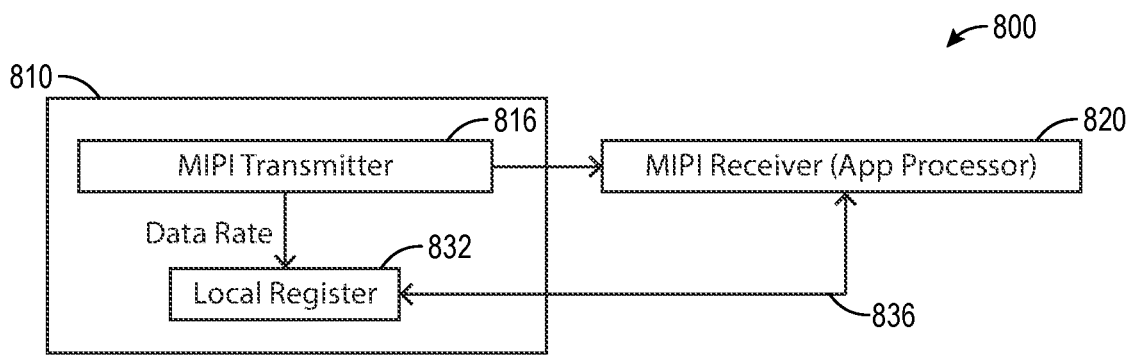
FIG. 8 is a partially schematic block diagram of another imaging system configured in accordance with various embodiments of the present technology.

FIG. 8 is a partially schematic block diagram of an alternative implementation of the imaging system 100 of FIG. 1. More specifically. FIG. 8 is a partially schematic block diagram of an imaging system 800 configured in accordance with various embodiments of the present technology. The imaging system 800 can be generally similar to the imaging system 100 of FIG. 1 except that an imager 810 of the imaging system 800 includes a local register 832 that (a) is coupled to a transmitter 116 of the imager 810, and (b) is coupled to a receiver 820 of the imaging system 800 via a communications interface 836. The communications interface 836 can be an I2C interface, an SPI, or another suitable interface. As discussed in greater detail below, the imager 810 can be configured to write anticipated event rates into the local register 832 (e.g., as opposed to writing the anticipated event rates into the header portions of frames transmitted to the receiver 820). Although shown coupled to the transmitter 816 downstream of the transmitter 816, the local register 832 can be coupled to the transmitter 816 upstream of the transmitter 816 in other embodiments, such as between the event signal processor and the transmitter 816.

Figure 9:
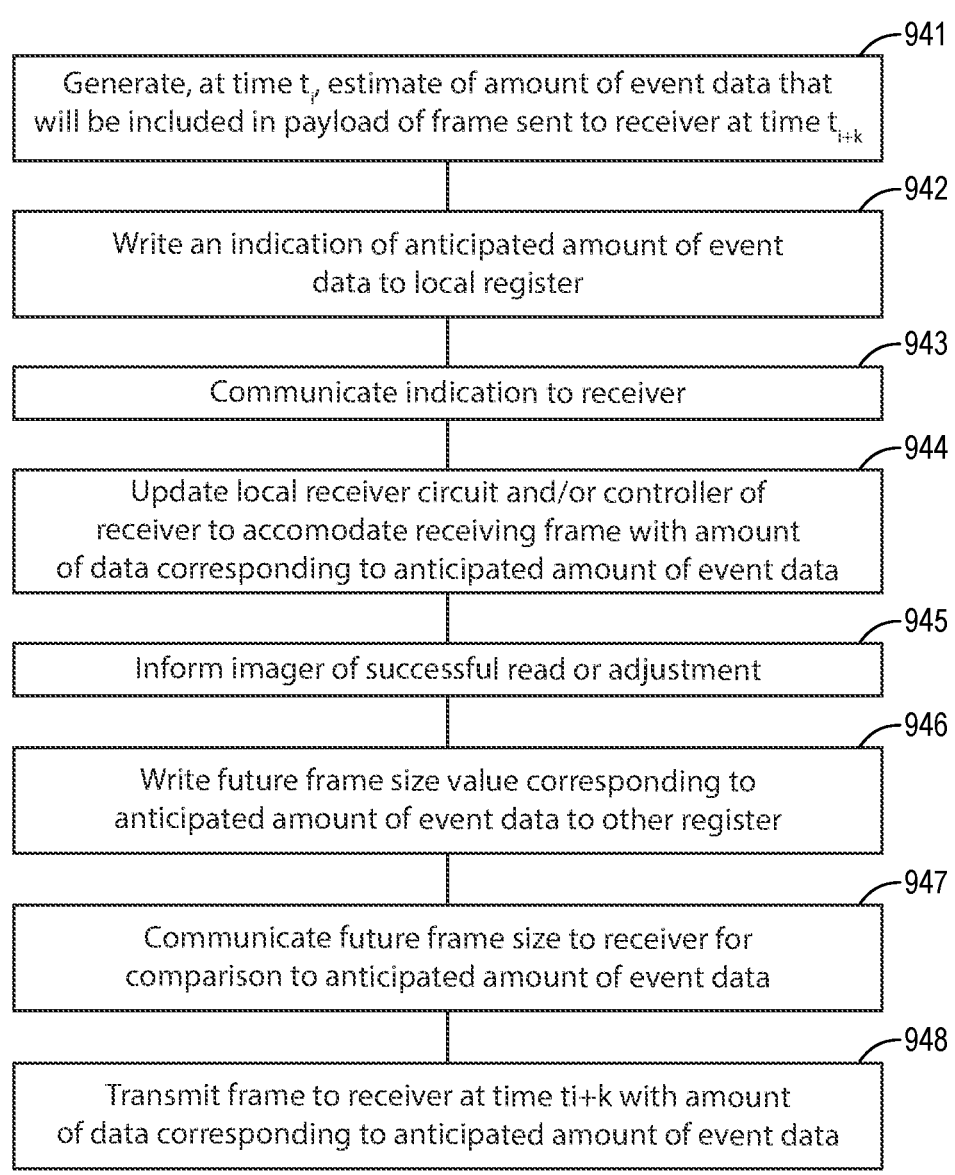
FIG. 9 is a flow diagram illustrating a method of operating an imaging system in accordance with various embodiments of the present technology.

FIG. 9 is a flow diagram illustrating a method 940 of operating the imaging system 800 of FIG. 8 in accordance with various embodiments of the present technology. The method 940 can be employed, for example, to transmit asynchronous event data from the imager 810 of the imaging system 800 to the receiver 820 of the imaging system 800 via a synchronous communications interface formed at least in part by the transmitter 816 of the imager 810 and the receiver 820. The method 940 is illustrated as a set of steps or blocks 941-948. All or a subset of one or more of the blocks 941-948 can be executed by various components of the imaging system 800. For example, all or a subset of one or more of the blocks 941-948 can be executed by (i) an array of event vision pixels, (ii) row control circuitry, (iii) column control circuitry, (iv) an event signal processor, (v) memory, (vi) a predictor block. (vii) the transmitter 816, (viii) an activity monitor circuit and/or (ix) the local register 832. Additionally, or alternatively, all or a subset of one or more of the blocks 941-948 can be executed by the receiver 820 (e.g., by a local receiver circuit and/or one or more controllers or processors of the receiver 820). Furthermore, any one or more of the blocks 941-948 can be executed in accordance with the discussion of FIGS. 1-8 above.

The method 940 begins at block 941 by generating, at time $t_i$, an estimate of an amount of event data that will be included in a payload of a frame sent to the receiver 120 at time $t_{i+k}$. In some embodiments, the estimate can be generated in a manner generally similar to the manner discussed above with reference to the imager 110 of FIG. 1 and/or to block 601 of the method 600 of FIG. 6A. The method 940 then proceeds to block 942 to write an indication of the anticipated amount of event data (or of a corresponding anticipated event rate) into the local register 832.

At block 943, the method 940 continues by communicating the indication of the anticipated amount of event data to the receiver 820. In some embodiments, communicating the indication of the anticipated amount of event data includes reading the indication from the local register 832. For example, the receiver 820 can periodically poll the local register 832 and read the indication from the local register 832 at block 943 using a processing unit of the receiver 820. The processing unit can be a same or a different processing unit of the receiver 820 than the processing unit of the receiver 820 used to control the synchronous communications interface coupling the transmitter 816 to the receiver 820.

At block 944, the method 940 continues by updating the local receiver circuit and/or a controller (e.g., a memory controller or a processor controlling the synchronous interface) of the receiver 820 to accommodate receiving an amount of data corresponding to the anticipated amount of event data communicated via the local register 832. For example, the receiver 820 can adjust the local receiver circuit and/or the controller to receive a frame at time $t_{i+k}$ having a payload with an amount of data corresponding to the anticipated amount of event data.

At block 945, the method 940 continues by informing the imager 810 that the receiver 820 has adjusted its local receiving circuit and/or controller to accommodate receiving an amount of data corresponding to the anticipated amount of event data read via the local register 832. For example, the receiver 820 can inform the imager 810 that it successfully read the indication of the anticipated amount of event data from the local register 832. In some embodiments, the receiver 820 can inform the imager 810 of the successful read via the communications interface 836, via the synchronous communications interface, or in another suitable manner.

At block 946, the method 940 continues by writing, into another register, a future frame size value corresponding to the anticipated amount of event data. For example, the imager 810 can write the future frame size value to the other register based at least in part on receiving the indication of a successful read from the receiver 820 at block 945. The other register can be a same register as or a different register from the local register 832 to which the imager 810 writes the indication of the anticipated amount of event data at block 942.

As block 947, the method 940 continues by reading the other register to confirm that the future frame size value matches the anticipated amount of event data communicated to the receiver 820 at block 943. For example, the receiver 820 can read the future frame size from the other register and compare the future frame size to the anticipated amount of event data. If the values align, the method 940 can proceed to block 948 to transmit the frame corresponding to the time $t_{i+k}$ with a payload that includes an amount of data (event data and/or dummy data) corresponding to the anticipated amount of event data. The method 940 can transmit the frame in a manner generally similar to the manner described above with reference to blocks 603-608 of the method 600 of FIG. 6A. On the other hand, if the values do not align, the method 940 can prevent, abort, or delay transmission of the frame corresponding to time $t_{i+k}$, or can continue with the transmission of the frame corresponding to $t_{i+k}$ using a previously confirmed anticipated amount of event data (e.g., an anticipated amount of event data corresponding to a frame sent to the receiver 820 prior to transmitting the frame corresponding to time $t_{i+k}$.

Although the blocks 941-948 of the method 940 are discussed and illustrated in a particular order, the method 940 illustrated in FIG. 9 is not so limited. In other embodiments, the method 940 can be performed in a different order. In these and other embodiments, any of the blocks 941-948 of the method 940 can be performed before, during, and/or after any of the other blocks 941-948 of the method 940. For example, blocks 945, 946, and/or 947 can be performed while performing block 948. Moreover, a person of ordinary skill in the relevant art will recognize that the illustrated method 940 can be altered and still remain within these and other embodiments of the present technology. For example, one or more blocks 941-948 of the method 940 can be omitted and/or repeated in some embodiments. As a specific example, blocks 945, 946, and/or 947 can be omitted from the method 940 in some embodiments. As another example, the imager 810 can be configured to transmit anticipated amounts of event data to the receiver 820 via a communications interface (e.g., via the communications interface 836) as opposed to writing the anticipated amounts of event data to a register for the receiver 820 to read.

As still another example, the method 940 can, in some embodiments, foresee a need for a larger or smaller frame size prior to transmission of the frame corresponding to time $t_{i+k}$ to the receiver 820. For example, the method 940 can generate a new estimate of the amount of event data that will be included in a payload of a frame sent to the receiver 820 at time $t_{i+k}$ that differs from the initial estimate of the amount of event data communicated to the receiver 820 at block 943. The new estimate of the amount of event data can be based at least in part on new information made available a predictor block of the imager 810 after communicating the initial estimate of the amount of event data to the receiver 820. The new information can include, for example, information demonstrating an uptick or downtick in the event rate prior to the transmission of the frame corresponding to time $t_{i+k}$ to the receiver 820, among other information such as excess event data that was generated for but excluded from transmission to the receiver 820 within a previous frame. Continuing with this example, the method 940 can write the new estimated amount of event data to the local register 832 prior to transmission of the frame corresponding to time $t_{i+k}$ to the receiver 820. The new estimated amount of event data can be written to a same or a different local register 832 as the local register 832 to which the method 940 wrote the initial estimated amount of event data. In turn, the receiver 820 can read the new estimate and adjust its local receiver circuit and/or controller prior to receiving the frame corresponding to time $t_{i+k}$.

Figure 10:
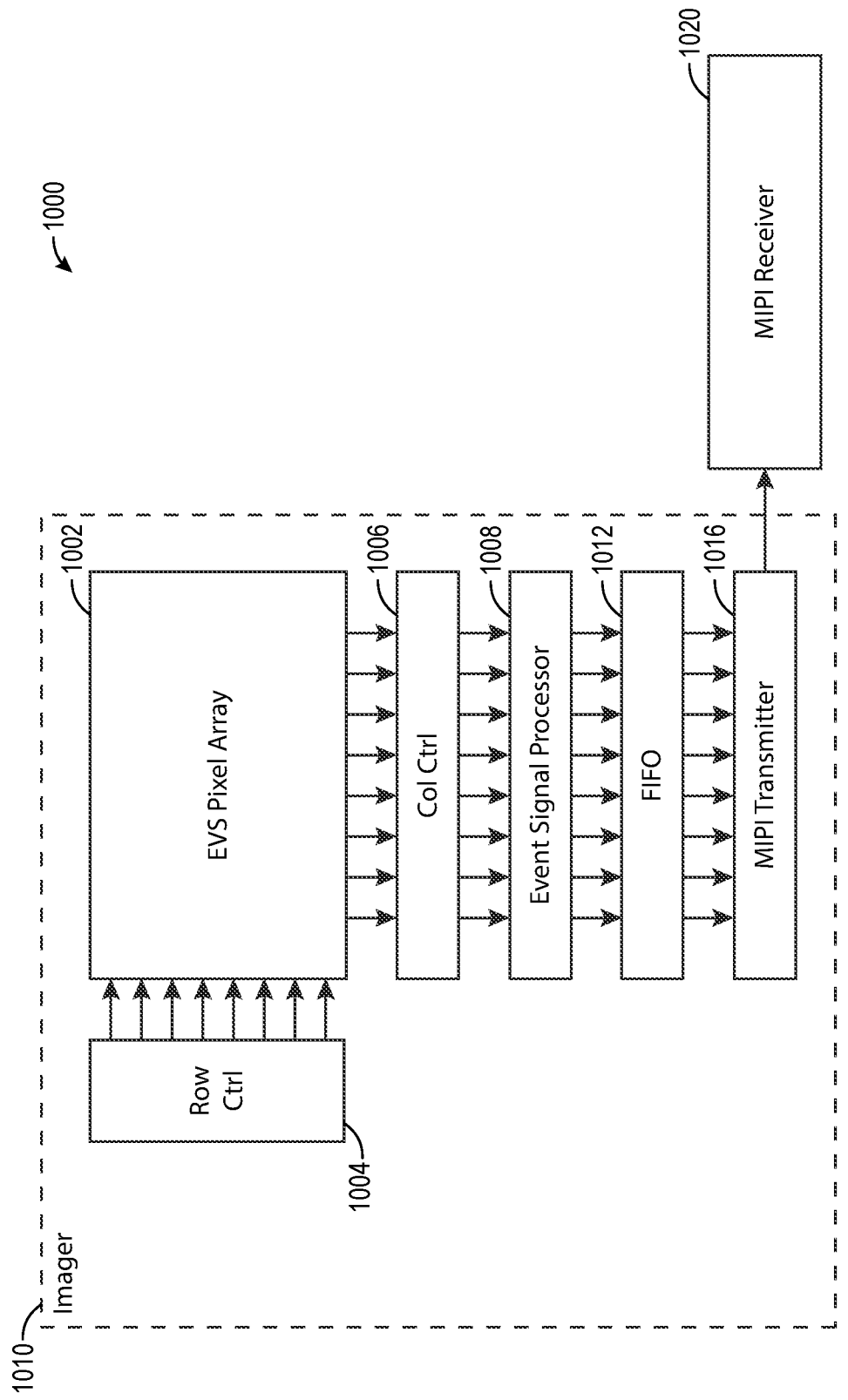
FIG. 10 is a partially schematic block diagram of still another imaging system configured in accordance with various embodiments of the present technology.

FIG. 10 is a partially schematic block diagram of an alternative implementation of the imaging system 100 of FIG. 1 and/or of the imaging system 800 of FIG. 8. More specifically, FIG. 10 is a partially schematic block diagram of an imaging system 1000 configured in accordance with various embodiments of the present technology. The imaging system 1000 can be generally similar to the imaging system 100 of FIG. 1 and/or the imaging system 800 of FIG. 8 in that the imaging system 1000 includes an array 1002 of event vision pixels, row control circuitry 1004, column control circuitry 1006, an event signal processor 1008, memory 1012, and a transmitter 1016 configured to transmit event data to a receiver 1020. Notably, however, the imaging system 1000 lacks a predictor block. Instead, a size of the memory 1012 can be large enough to store multiple frames of event data and/or to cover all possible events during a desired frame period. For example, the size of the memory 1012 can be large enough to store multiple frames of event data even when every event vision pixel in the array 1002 detects an event in each frame. Thus, in this embodiment, the imager 1010 can have advanced knowledge of exactly how much event data will be included in a frame transmitted to the receiver 1020 at a future point in time. The imager 1010 can therefore provide the receiver 1020 an indication of that exact amount of event data prior to transmitting the event data in the future frame. In other words, the imaging system 1000 can largely be operated in a manner similar to the manner described above with reference to the methods 600 and 690 of FIGS. 6A and 6B except that (i) the exact amount of event data for a frame corresponding to time $t_{i+k}$ is ascertained and communicated to the receiver 1020 at blocks 601 and 602 of the method 600, and (ii) all or a subset of the blocks 604-607 of the method 600 can be omitted. Additionally, or alternatively, the imaging system 1000 can largely be operated in a manner similar to the manner described above with reference to the method 940 of FIG. 9 (assuming that the imaging system 1000 includes a local register and a communications interface similar to the imaging system 800 of FIG. 8), except that the exact amount of event data for a frame corresponding to time $t_{i+k}$ is ascertained and communicated to the receiver 1020 at blocks 941-943 of the method 940.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An imager, comprising:
    an array of event vision pixels, each pixel of the array configured to generate event data based at least in part on events indicated in incident light received from an external scene; and
    a synchronous communications transmitter configured to transmit frames of data to a synchronous communications receiver,
    wherein the imager is configured to:
        communicate, at a first time and to the receiver, an anticipated amount of event data that will be included in a frame transmitted from the transmitter to the receiver at a second time occurring after the first time, and
        transmitting the frame to the receiver at the second time, wherein the frame includes an amount of data corresponding to the anticipated amount of event data.

2. The imager of claim 1, wherein the anticipated amount of event data is a based at least in part on prediction of an amount of event data that will be generated at a future point in time for transmission to the receiver in the frame, and wherein the imager further comprises a predictor block configured to generate the prediction.

3. The imager of claim 2, wherein the predictor block includes a Kalman filter usable to generate the prediction.

4. The imager of claim 2, wherein the predictor block is configured to generate the prediction based at least in part on one or more actual amounts of event data generated for or included within one or more frames previously transmitted from the imager to the receiver.

5. The imager of claim 2, wherein the predictor block is configured to generate the prediction based at least in part on information corresponding to a 1-dimensional (1D) or 2-dimensional (2D) geometrical distribution of detected events across the event vision pixels of the array.

6. The imager of claim 2, the information corresponding to the 1D or 2D geometrical distribution of detected events includes or is based at least in part on shapes formed by event vision pixels of the array that have detected events at a given time, optical flow of those shapes across multiple frames, or a combination thereof.

7. The imager of claim 2, wherein the predictor block is configured to generate the prediction based at least in part on accuracy of one or more previously generated estimates relative to one or more corresponding actual amounts of event data that were generated.

8. The imager of claim 2, wherein:
    each event vision pixel of the array includes a latch configured to conduct a unit current if and only if the event vision pixel detects an event;
    a sum of unit currents across the array at a given time provides an indication of global activity of the event vision pixels of the array;
    the imager further comprises an activity monitor circuit configured to generate an activity monitor signal based at least in part on the sum of the unit currents; and
    the predictor block is configured to generate the prediction based at least in part on the activity monitor signal.

9. The imager of claim 2, wherein the predictor block is further configured to generate a confidence interval corresponding to the prediction.

10. The imager of claim 1, wherein:
    the frame is a second frame; and
    to communicate the anticipated amount of event data, the imager is configured to transmit an indication of the anticipated amount of event data to the receiver in a header portion of a first frame transmitted from the imager to the receiver at a time occurring before the second time.

11. The imager of claim 1, wherein:
    the transmitter is configured to transmit the frames of data to the receiver via a synchronous communications interface;
    the imager further comprises a local register couplable to the receiver via a communications interface separate from the synchronous communications interface; and
    to communicate the anticipated amount of event data, the imager is configured to write an indication of the anticipated amount event data to the local register at the first time.

12. The imager of claim 11, further comprising another register separate from the local register, wherein the imager is further configured to write a future frame size value to the other register based at least in part on receiving, from the receiver, an indication of a successful read of the indication of the anticipated amount of event data from the local register.

13. The imager of claim 1, wherein the imager is configured, when the imager determines that an actual amount of event data that will be included in the frame is less than the anticipated amount of event data, to pad a payload portion of the frame with dummy data such that the amount of data included in the frame is equivalent to the anticipated amount of event data.

14. The imager of claim 1, wherein the imager is configured, when the imager determines that an amount of event data generated for the frame is greater than the anticipated amount of event data, to limit an amount of generated event data inserted into the frame such that the amount of data included in the frame is less than the amount of event data generated for the frame and is equivalent to the anticipated amount of event data.

15. The imager of claim 14, further comprising a memory, wherein the imager is configured to store excess generated event data that is not included in the frame in the memory for transmission from the transmitter to the receiver in another frame at a time occurring after the second time.

16. The imager of claim 1, further comprising a memory configured to store several frames worth of event data, wherein the anticipated amount of event data is an actual amount of event data ascertained based at least in part on event data stored in the memory.

17. The imager of claim 1, wherein the transmitter includes a mobile industry processor interface (MIPI) transmitter.

18. A method of operating an imager including one or more event vision pixels, the method comprising:
    communicating, at a first time and to a synchronous communications receiver, an anticipated amount of data that will be included in a frame transmitted from the imager to the receiver at a second time occurring after the first time; and
    transmitting the frame to the receiver at the second time, wherein the frame includes an amount of data corresponding to the anticipated amount of data.

19. The method of claim 18, wherein the anticipated amount of data is based at least in part on a prediction of an amount of event data that will be generated at a future point in time for transmission to the receiver in the frame, and wherein the method further comprises generating the prediction.

20. The method of claim 19, wherein generating the prediction includes generating the prediction based at least in part on one or more amounts of event data previously generated for transmission from the imager to the receiver in one or more previous frames.

21. The method of claim 19, wherein generating the prediction includes generating the prediction based at least in part on information corresponding to a 1-dimensional (1D) or 2-dimensional (2D) geometrical distribution of detected events across the one or more event vision pixels of the imager.

22. The method of claim 19, wherein generating the prediction includes generating the prediction based at least in part on an indication of global activity of event vision pixels of the one or more event vision pixels that have detected an event at a given point in time.

23. The method of claim 19, further comprising generating a confidence interval corresponding to the prediction.

24. The method of claim 18, wherein the anticipated amount of data is an actual amount of event data that has been generated for transmission to the receiver in the frame, and wherein the method further comprises ascertaining the actual amount of event data based at least in part on event data stored to a memory of the imager.

25. The method of claim 18, wherein the frame is a second frame, and wherein communicating the anticipated amount of data includes inserting an indication of the anticipated amount of data into a first frame and transmitting the first frame to the receiver at a time occurring before the second time.

26. The method of claim 18, wherein communicating the anticipated amount of data includes writing an indication of the anticipated amount of data to a local register of the imager.

27. The method of claim 26, further comprising writing a write a future frame size value to another register of the imager based at least in part on receiving, from the receiver, an indication of a successful read of the indication of the anticipated amount of data from the local register.

28. The method of claim 18, further comprising:
    determining that an amount of event data generated for inclusion in the frame is less than the anticipated amount of data; and
    padding the frame with dummy data such that the amount of data included in the frame is equivalent to the anticipated amount of data.

29. The method of claim 18, further comprising:
    determining that an amount of event data generated for inclusion in the frame is greater than the anticipated amount of data; and
    limiting an amount of event data included in the frame such that the amount of data included in the frame is less than the amount of event data generated for inclusion in the frame and is equivalent to the anticipated amount of data.

30. The method of claim 29, wherein limiting the amount of event data includes discarding at least a portion of the amount of event data generated for inclusion in the frame, and wherein the portion includes event data that is not transmitted to the receiver in the frame.

31. The method of claim 29, wherein limiting the amount of event data includes storing, for transmission to the receiver in another frame, at least a portion of the amount of event data generated for inclusion in the frame, and wherein the portion includes event data that is not transmitted to the receiver in the frame.

32. The method of claim 18, further comprising:
    generating an updated anticipated amount of data that will be included in the frame; and
    communicating, prior to transmitting the frame, the updated anticipated amount of data to the receiver as a revision of the anticipated amount of data.

33. The method of claim 18, wherein:
    the frame is a first frame, the anticipated amount of data is a first anticipated amount of data, and the amount of data is a first amount of data; and
    the method further comprises—
        communicating, to the receiver and at a third time occurring after the second time, a second anticipated amount of data that will be included in a second frame transmitted from the imager to the receiver at a fourth time occurring after the third time, wherein the second anticipated amount of data is different from the first anticipated amount of data; and transmitting the second frame to the receiver at the fourth time, wherein the second frame includes a second amount of data corresponding to the second anticipated amount of data, wherein the second amount of data is different from the first amount of data.

34. An imaging system, comprising:

a synchronous communications receiver; and an imager including a synchronous communications transmitter (a) operably connected to the synchronous communications receiver via a synchronous communications interface and (b) configured to transmit frames of data to the synchronous communications receiver via the synchronous communications interface, the imager further including an array of event vision pixels, each pixel of the array configured to generate event data based at least in part on events indicated in incident light received from an external scene, wherein the imager is configured to:

communicate, prior to transmission of a frame of data from the transmitter to the receiver, an indication of an anticipated amount of data that will be included in the frame when the frame is transmitted to the receiver at a future point in time; and after communicating the indication of the anticipated amount of data, transmit the frame to the receiver, wherein the frame includes an amount of data corresponding to the anticipated amount of data, and wherein, to accommodate receiving the frame with the amount of data corresponding to the anticipated amount of data, the receiver is configured to adjust its local receiver circuit prior to receiving the frame from the transmitter.

35. The imaging system of claim 34, wherein:

the anticipated amount of data is based at least in part on a prediction of an amount of event data that will be included in a payload portion of the frame when the frame is transmitted to the receiver at the future point in time; and the imager further comprises a predictor block configured to generate the prediction.

36. The imaging system of claim 35, wherein:

the imager further comprises an activity monitor circuit configured to generate an activity monitor signal representative of a number of the event vision pixels in the array that have detected an event at a given time; and the predictor block is configured to generate the prediction based at least in part on the activity monitor signal.

37. The imaging system of claim 34, wherein:

the frame is a second frame of event data; and to communicate the indication of the anticipated amount of data, the imager is configured to (a) insert the indication into a first frame of event data and (b) transmit the first frame from the transmitter to the receiver prior to transmitting the second frame to the receiver.

38. The imaging system of claim 34, wherein:

the imager further comprises a local register coupled to the receiver via a communications interface;

to communicate the indication of the anticipated amount of data to the receiver, the imager is configured to write the indication to the local register; and the receiver is configured to read the indication from the local register prior to receiving the frame from the transmitter.

39. The imaging system of claim 38, wherein the communications interface coupling the local register to the receiver (a) includes an inter-integrated circuit (I2C) interface or a serial peripheral interface (SPI), and (b) is separate from the synchronous communications interface.

40. The imaging system of claim 38, wherein:

the receiver is further configured to notify the imager of the adjustment of its local receiver circuit;

the imager further comprises another register separate from the local register;

the imager is further configured to write, to the other register and based at least in part on the notification of the adjustment received from the receiver, a future frame size value corresponding to (a) the anticipated amount of data and (b) the frame; and the receiver is configured to read the future frame size value from the other register and compare the future frame size value to the anticipated amount of data prior to receiving the frame from the transmitter.

41. The imaging system of claim 34, wherein the transmitter includes a mobile industry processor interfaces (MIPI) transmitter, and wherein the receiver includes a MIPI receiver.

42. The imaging system of claim 34, wherein:

the imager further comprises a memory configured to store several frames worth of event data; and the anticipated amount of data is an actual amount of event data ascertained based at least in part on event data generated by the event vision pixels and stored in the memory.

\* \* \* \* \*